United States Patent  (10) Patent No.: US 9,390,071 B2
Jang et al.  (45) Date of Patent: Jul. 12, 2016

(54) SYSTEM AND METHOD FOR DISPLAYING PAGES ON MOBILE DEVICE

(71) Applicant: Samsung Electronics Co., Ltd., Gyeonggi-do (KR)

(72) Inventors: Sihak Jang, Gyeonggi-do (KR); Yuran Kim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 343 days.

(21) Appl. No.: 13/726,343

(22) Filed: Dec. 24, 2012

(65) Prior Publication Data

US 2013/0191733 A1  Jul. 25, 2013

(30) Foreign Application Priority Data

Jan. 19, 2012 (KR) .......................... 10-2012-0006106

(51) Int. Cl.
G06F 17/21 (2006.01)
G06F 17/22 (2006.01)

(52) U.S. Cl.
CPC .......... *G06F 17/212* (2013.01); *G06F 17/2211* (2013.01)

(58) Field of Classification Search
None
See application file for complete search history.

(56) References Cited

U.S. PATENT DOCUMENTS

| | | | |
|---|---|---|---|
| 2005/0184999 A1 | 8/2005 | Daioku | |
| 2007/0143688 A1* | 6/2007 | Cheng et al. | 715/738 |
| 2008/0263442 A1* | 10/2008 | Plumley et al. | 715/255 |
| 2010/0035657 A1* | 2/2010 | Blenessy et al. | 455/566 |
| 2010/0175018 A1 | 7/2010 | Petschnigg et al. | |
| 2010/0251104 A1* | 9/2010 | Massand | 715/249 |
| 2011/0050594 A1 | 3/2011 | Kim et al. | |
| 2011/0087955 A1 | 4/2011 | Ho et al. | |
| 2012/0005617 A1 | 1/2012 | Lee et al. | |
| 2012/0198330 A1* | 8/2012 | Koppel | G06F 17/217 715/251 |
| 2012/0240036 A1* | 9/2012 | Howard et al. | 715/251 |
| 2012/0246565 A1* | 9/2012 | Kumamoto | 715/273 |

* cited by examiner

*Primary Examiner* — Stephen Hong
*Assistant Examiner* — Sanchita Roy
(74) *Attorney, Agent, or Firm* — Cha & Reiter, LLC

(57) ABSTRACT

An apparatus and method is provided that allows users to easily and rapidly search and locate parts of pages in an e-book that they have read, even though the form of pages has changed. The apparatus and method for displaying pages on an electronic mobile device includes: displaying at least one page of a plurality of pages of an e-book; detecting the presence of an event; changing the form of the displayed pages to a form corresponding to the detected event; and displaying the difference between the forms before and after the change.

14 Claims, 15 Drawing Sheets

FIG. 8
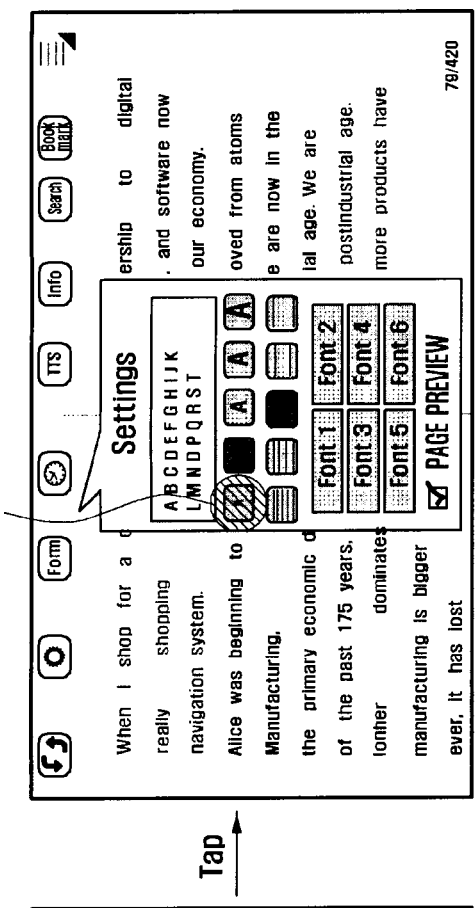
[a]
Tap →
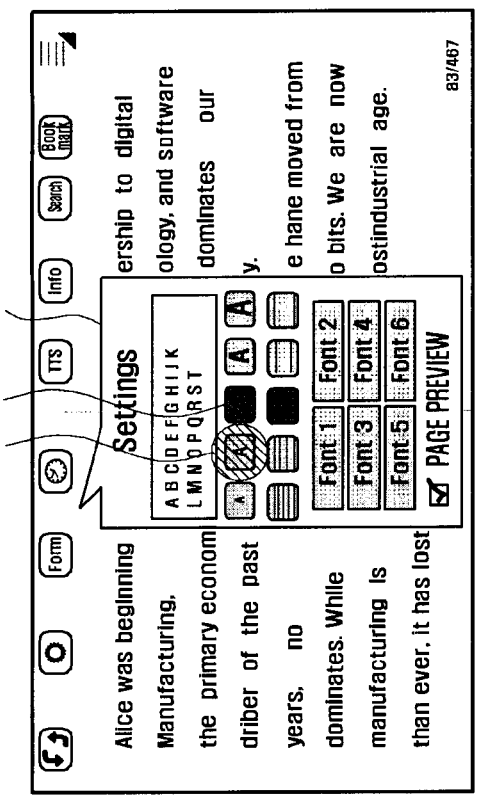
[b]
Tab →
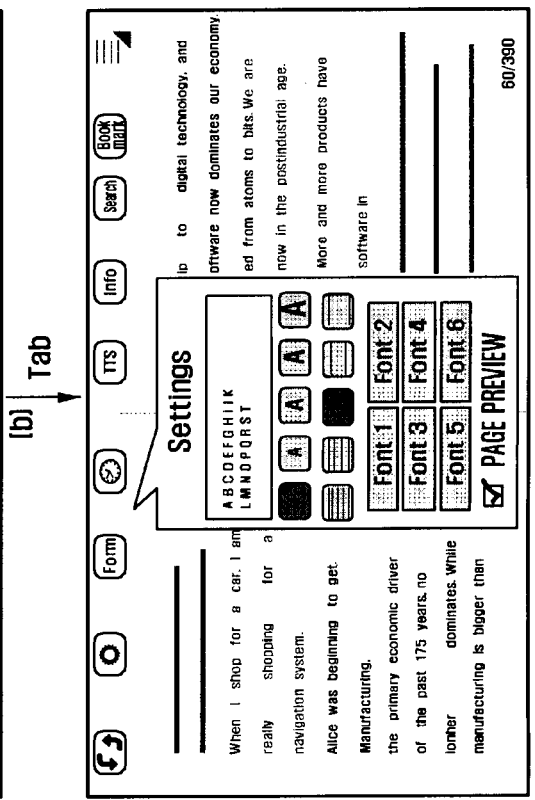
[c]

FIG. 11
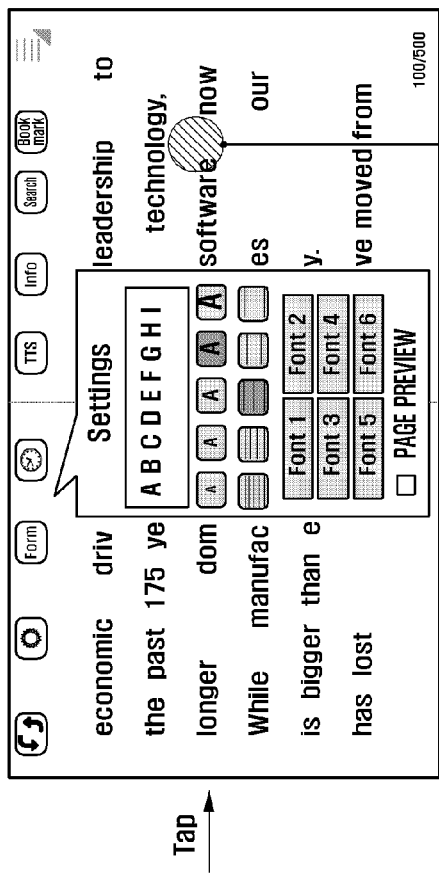
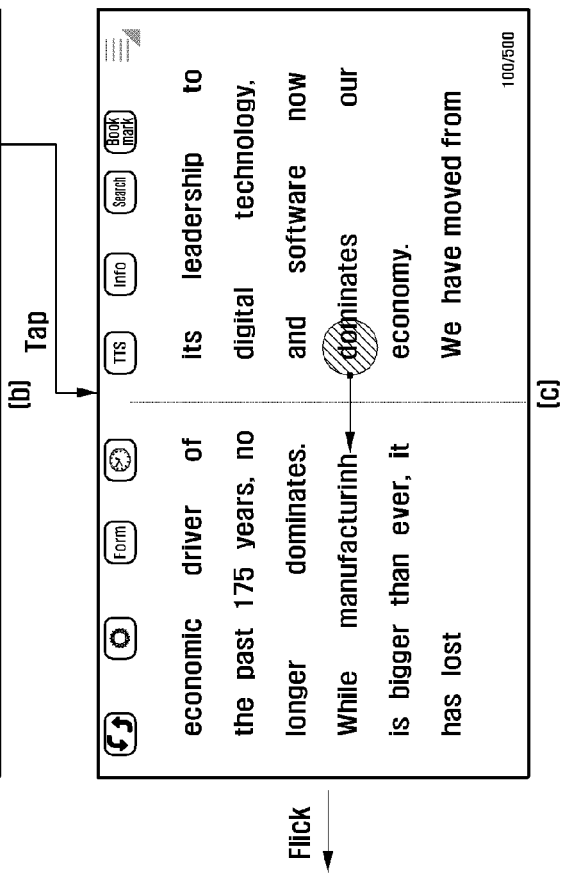
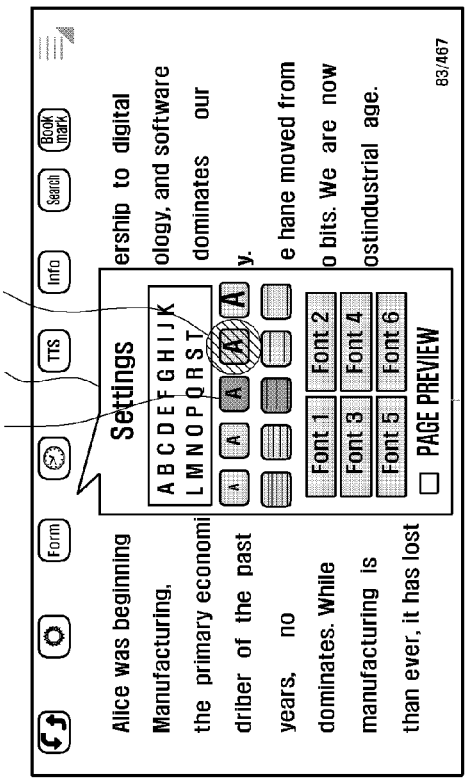
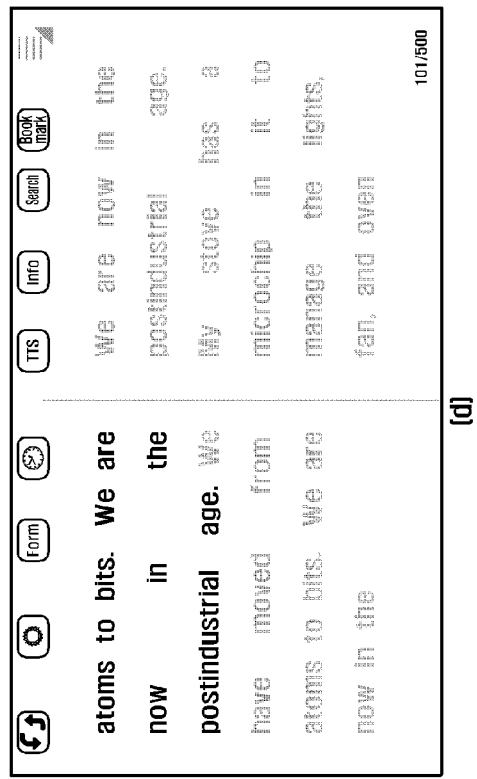

FIG. 12
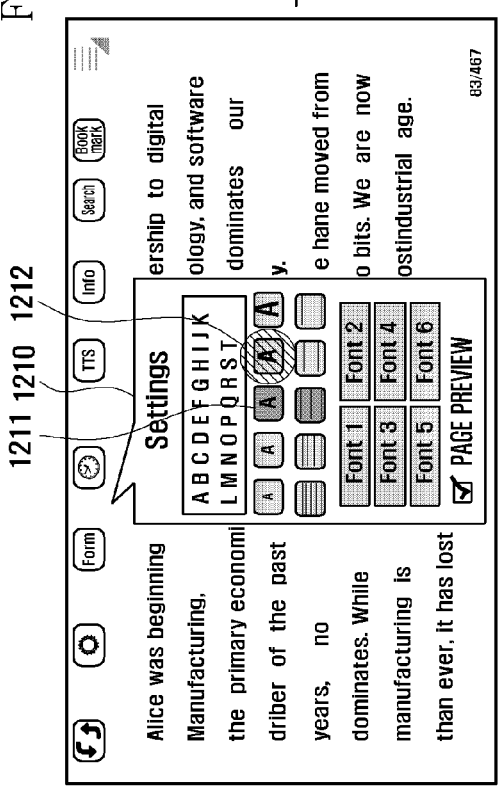
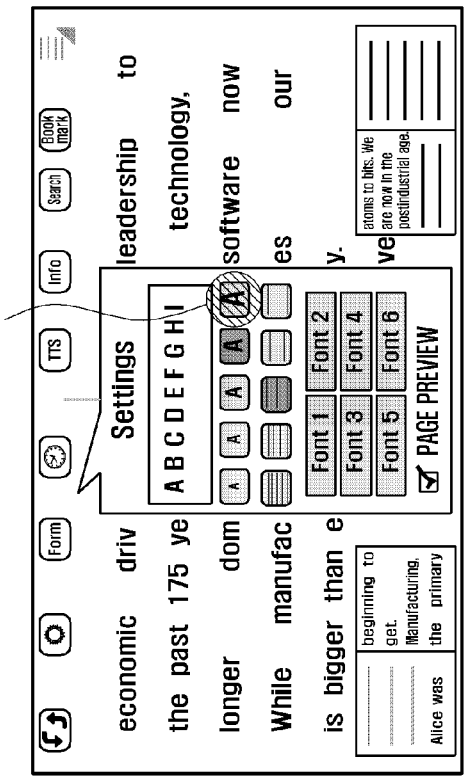
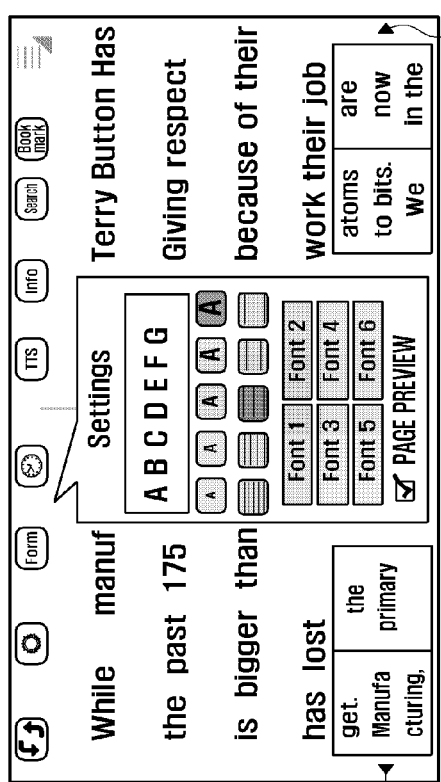

FIG. 13
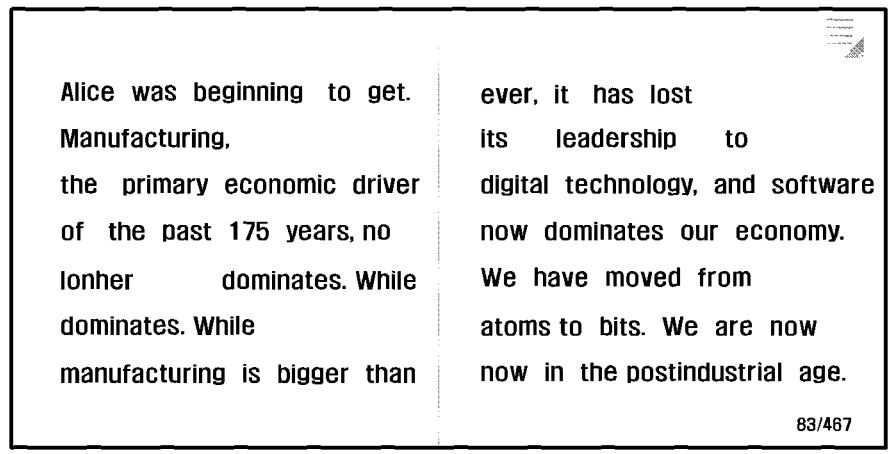
[a]
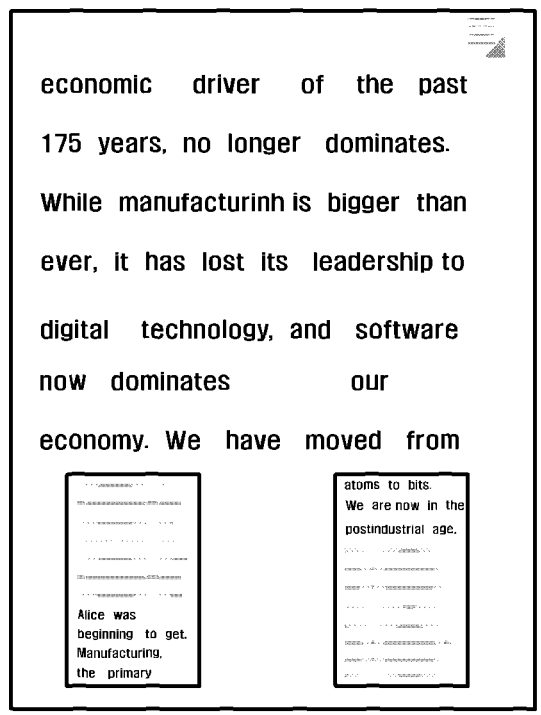
[b]

FIG. 15

Alice was beginning to get. Manufacturing, the primary economic driver of the past 175 years, no lonher dominates. While dominates. While manufacturing is bigger than ever, it has lost its leadership to digital technology, and software now dominates our economy. We have moved from atoms to bits. We are now now in the postindustrial age.

100/500

[a]

When I shop for a car, I am really shopping for a navigation system.
Alice was beginning to get. Manufacturing,
the primary economic driver of the past 175 years, no lonher dominates. While manufacturing is bigger than ever, it has lost its leadership to digital technology, and software now dominates our economy.
We have moved from atoms to bits. We are now in the postindustrial age. We are now in the postindustrial age. More and more products have software in

79/420

[b]

SYSTEM AND METHOD FOR DISPLAYING PAGES ON MOBILE DEVICE

CLAIM OF PRIORITY

This application claims the benefit under 35 U.S.C. §119(a) of a Korean patent application filed on Jan. 19, 2012 in the Korean Intellectual Property Office and assigned Serial No. 10-2012-0006106, the entire disclosure of which is hereby incorporated by reference.

BACKGROUND

1. Technical Field

This present disclosure relates generally to portable electronic devices and e-book type readers, and more particularly, to a method and apparatus for displaying pages of a document such as an e-book via a mobile device with an e-book reader function, according to a user's input information related to the document being displayed.

2. Description of the Related Art

An electronic book (e-book) refers to a book-length publication in digital form, including text, images, etc. that can be used as a printed book. Users can easily purchase and read e-books via electronic mobile devices with an e-book reader function, such as a tablet PC, a smart phone, a game device, etc., anywhere and anytime they want. In general, e-books are cheaper than printed books and occupy less space. This has led to an increase in the number of e-book users.

Mobile devices may change the display format of each page, e.g., text size or font size, line spacing, etc., according to a user's input information. Mobile devices are capable of displaying pages in different formats before and after the change. If the display format of an e-book that a user is reading changes, he/she may miss a part of the displayed e-book, e.g., a page, a paragraph, a line, or the like. In that case, he/she must search for the missing part. This can result in disruption and inconveniences for the user.

SUMMARY OF THE INVENTION

An aspect of the present invention is to solve at least the above-mentioned problems and/or disadvantages and to provide at least the advantages described below. Accordingly, an aspect of the present invention is to provide a method and apparatus that allows users to easily and rapidly search for and locate a missing part of an e-book or document displayed on an electronic mobile device, even though the form of the e-book or document has changed.

In accordance with an exemplary embodiment of the present invention, a method of displaying at least one page of a plurality of pages of an e-book on an electronic mobile device is provided. The method includes: displaying pages of an e-book; detecting the presence of an event; changing the form of the displayed pages to a form corresponding to the detected event; and displaying the difference between the forms before and after the change.

In accordance with another exemplary embodiment of the present invention, an apparatus for displaying pages on a electronic mobile device is provided. The apparatus includes: an input unit for creating an event according to a request for a change in form; a controller for changing the form of at least one page of a plurality of pages to a form corresponding to the event; and a display unit for displaying the at least one page and the difference between the forms before and after the change.

BRIEF DESCRIPTION OF THE DRAWINGS

The above and other features, aspects and advantages of the certain exemplary embodiments of the present invention will become more apparent from the following detailed description viewed in conjunction with the accompanying drawings, in which:

FIGS. 8A to 8C illustrate screens to describe a method for displaying the content decreased in size, according to a further embodiment of the present invention;

FIGS. 11A to 11D illustrate screens to describe a method for displaying the content increased in size, according to another embodiment of the present invention;

FIGS. 12A to 12C illustrate screens to describe a method for displaying the content increased in size, according to an embodiment of the present invention;

FIGS. 13A and 13B illustrate screens to describe a method for displaying pages via the rotation of a mobile device, according to one embodiment of the present invention;

FIGS. 15A and 15B illustrate screens to describe a method for displaying pages via the rotation of a mobile device, according to a further embodiment of the present invention.

DETAILED DESCRIPTION OF EXEMPLARY EMBODIMENTS

Figure 1:
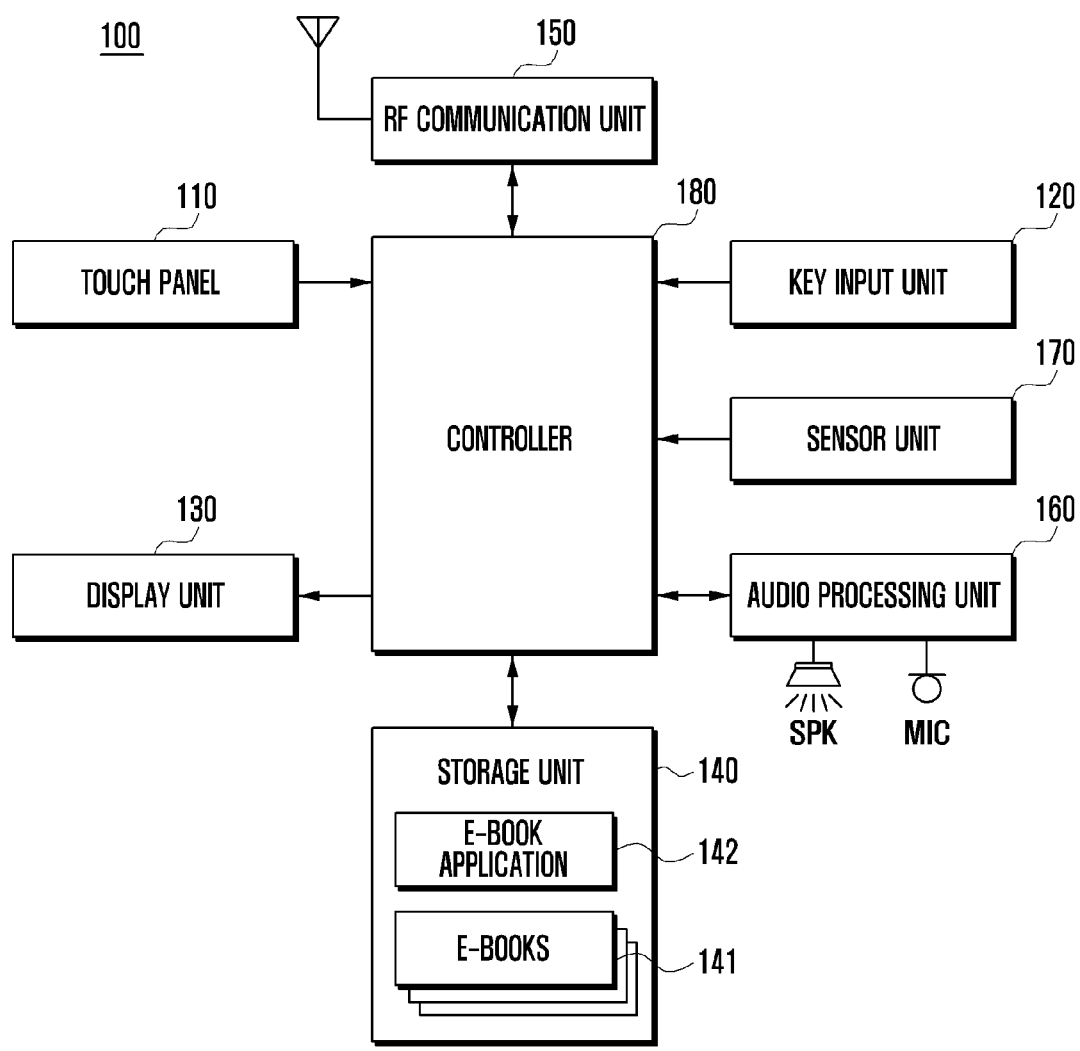
FIG. 1 illustrates a schematic block diagram showing a configuration of a mobile device according to an embodiment of the present invention.

Hereinafter, exemplary embodiments of the invention are described in detail with reference to the accompanying drawings. The terms or words described in the present description and the claims should not be limited by a general or lexical meaning, instead should be understood in the context of the description of the exemplary embodiments. Therefore, one skilled in the art will understand that the embodiments disclosed in the description and configurations illustrated in the drawings are only preferred embodiments and there may be various modifications, alterations, and equivalents thereof to replace the embodiments at the time of filing this application. Although the drawings represent various embodiments of the present invention, the drawings are not necessarily to scale and certain features may be exaggerated or omitted in order to better illustrate and explain the invention.

The term 'content' refers to information that electronic mobile devices provide to users. In an embodiment of the present invention, content also refers to information included in the pages of e-books. That is, content in a page may be, for example text. The content in a page may also be, for example, images, icons, thumbnail images and user's input information. E-books may be classified, according to field, into book, magazine, newspaper, comic, specialty publication, etc. Each field may be further sub-divided. For example, book may be classified into novel, essay, poem, etc.

The term 'form' refers to the format of pages. For example, form may include text size or font size, font, letter spacing, line spacing, style, page direction, etc. Pages of an e-book may be displayed on electronic mobile devices in a widthwise or lengthwise direction. That is, mobile devices display pages of e-books wider on the display in the lengthwise direction than in the widthwise direction or narrower on the display in the widthwise direction than in the lengthwise direction.

The term 'to guide' refers to an operation where, when a form is changed, the mobile device displays the difference between the forms before and after the change.

The page display apparatus and method according to the present invention can be applied to all types of electronic mobile devices with touch screens. For example, the electronic mobile device can be applied to mobile phones, smart phones, tablet PCs, hand-held PCs, Portable Multimedia Players (PMPs), Personal Digital Assistants (PDAs), etc. In the following description, it is assumed that the page display apparatus and method is applied to mobile devices with touch screens.

The page display apparatus and method according to the present invention displays the difference between the forms before and after the change, in various modes that will be described in detail in the following description. Detailed descriptions of well-known functions and structures incorporated herein may be omitted to avoid obscuring the subject matter of the invention.

FIG. 1 illustrates a schematic block diagram showing a configuration of an electronic mobile device according to an embodiment of the present invention.

Referring to FIG. 1, the electronic mobile device 100 includes a touch screen 110, a key input unit 120, a display unit 130, a storage unit 140, an RF communication unit 150, an audio processing unit 160, a speaker (SPK), a microphone (MIC), a sensor unit 170 and a controller 180.

The touch screen 110 is installed onto the display unit 130. The touch screen 110 detects a user's touch gestures which creates an event, and transfers the corresponding signals to the controller 180. The controller 180 identifies touch gestures according to the received signals, and performs the corresponding control operations. Examples of the touch gestures are touch, tap, long tap, drag, sweep, etc. 'Touch' refers to a gesture that makes contact with at least one point on the touch screen. 'Tap' refers to a gesture that strikes gently on at least one point on the touch screen, i.e., a drop gesture. 'Long tap' refers to a gesture that contacts at least one point on the touch screen for longer than the 'tap' gesture and then releases the contact. 'Drag' refers to a gesture that contacts at least one point on the touch screen and then moves to another location without removing the contact. 'Sweep' refers to a gesture that brushes lightly on the touch panel with the user's finger or an object. 'Sweep' is also referred to as 'flick.' The touch screen 110 may be implemented with any of the various types of screens, including resistive type, a capacitive type, and electromagnetic induction type, etc.

The key input unit 120 includes a number of input keys and function keys that receive numbers and letters and set a variety of functions in the electronic mobile device 100. The function keys include direction keys, side keys, shortcut keys, etc., which are set to perform specific functions. The key input unit 120 creates key signals, related to a user's settings and function controls of the mobile device 100, and transfers them to the controller 180. Examples of the key signals include a signal for turning on/off the electronic mobile device 100, a signal for adjusting the volume, a signal turning on/off the screen, etc. The controller 180 controls corresponding components according to the key signals.

The display unit 130 converts digital data from the controller 180 into analog data and displays the analog data on the display unit 130. The display unit 130 displays a variety of screens according to the corresponding function of the controller 180, e.g., a lock screen, a home screen, an application execution screen, etc. A lock screen refers to a screen with a lock pattern displayed when the display unit 130 is turned on. In that case, when a touch gesture for unlocking the lock is performed on the lock screen, the controller 180 controls the display unit 130 to display a home screen or an application execution screen. A home screen refers to a screen showing a number of icons corresponding to application programs. When the user selects an icon corresponding to an application program, the controller 180 executes the appropriate application program, and controls the display unit 130 to display the executed application screen.

The display unit 130 displays one of the screens as a main screen and the other as a sub-screen, superimposed on the main screen, under the control of the controller 180. For example, the display unit 130 displays pages of an e-book as the main screen and a pop-up window for changing the form of the page as a sub-screen.

When a change in the form of a page is executed, the display unit 130 controlled by controller 180, displays the difference between the forms before and after the change. For example, display unit 130 first displays the content of a target page. Subsequently, the content of another page is added to a target page. According to the change of form, the display unit 130 now displays the added content after the change and the content that has been included in the target page. A target page refers to a page displayed before and after the change of form. If part of the content in a target page goes over to another page, according to the change of form, the display unit 130 displays a preview of the content on the target page. A preview includes pages to which content has moved from the target page.

The display unit 130 may be implemented with a flat display panel, such as a Liquid Crystal Display (LCD), an Organic Light Emitting Diode (OLED), an Active Matrix Organic Light Emitting Diodes (AMOLED), or the like.

The storage unit 140 stores an operating system (OS) for booting the electronic mobile device 100 and application programs. The storage unit 140 also stores data, such as text, videos, audios, etc. The storage unit 140 includes a program storage area and a data storage area.

The data storage area stores data created when the electronic mobile device 100 is used or when data is downloaded from an external system. The data storage area also stores screen data to be displayed via the display unit 130 and values to set the operations of the electronic mobile device 100. The data storage area temporarily stores data via a copy and paste command. In an embodiment of the present invention, the data storage area stores a number of e-books 141, and also reading state information regarding the respective e-books 141. Reading state information includes page read, date read, page to be read, user's input information, etc. User input information refers to information that the user additionally input to a page of an e-book, e.g., a memo, a highlight, an image, a bookmark, etc. User input information may be displayed until the corresponding page is opened (displayed).

The program storage area stores an operating system (OS) for booting and controlling the entire operation of the electronic mobile device 100, and a number of application programs. In an embodiment of the present invention, the program storage area stores at least an e-book application program 142 for displaying the difference between the forms of an e-book before and after a change.

The RF communication unit 150 performs a voice/video call, data communication, digital broadcast reception, etc., under the control of the controller 180. To this end, the RF communication unit 150 may include, for example, a mobile communication module (e.g., a 3-Generation (3G) mobile communication module, 3.5G, 4G, etc.), a short-range communication module (e.g., Wi-Fi module), and a digital broadcasting module (e.g., a DMB module), etc.

The audio processing unit 160 converts digital audio data, output from the controller 180, into analog audio signals and transfers them to the speaker (SPK). The audio processing unit 160 also converts analog audio signals such as voice, received via the microphone, into digital audio data, and transfers them to the controller 180.

The sensor unit 170 detects signals related to the change in location and posture (rotation direction) of the electronic mobile device 100 and transfers the information regarding the detected signals to the controller 180. The sensor unit 170 may be implemented with an acceleration detector. The sensor unit 170 converts the detected signal into an electrical signal proportional to the physical quantity of the detected signal. After that, the sensor unit 170 converts the electrical analog signal into a digital signal for transmission to the controller 180. If the electronic mobile device 100 is changed in posture (oriented), the controller 180 changes the form of each of the displayed pages of an e-book according to the change in the orientation of the electronic mobile device 100.

The controller 180 controls the entire operation of the electronic mobile device 100 and the signals transmitted among the components therein. The controller 180 also processes data and controls the electric power supplied to the components from the battery. The controller 180 executes the application programs stored in the program storage area. In particular, the controller 180 detects, for example, a signal corresponding to an event for requesting a change of form and changes the form according to the event. The controller 180 controls the display unit 130 to display the difference between the forms before and after the change.

Figure 2:
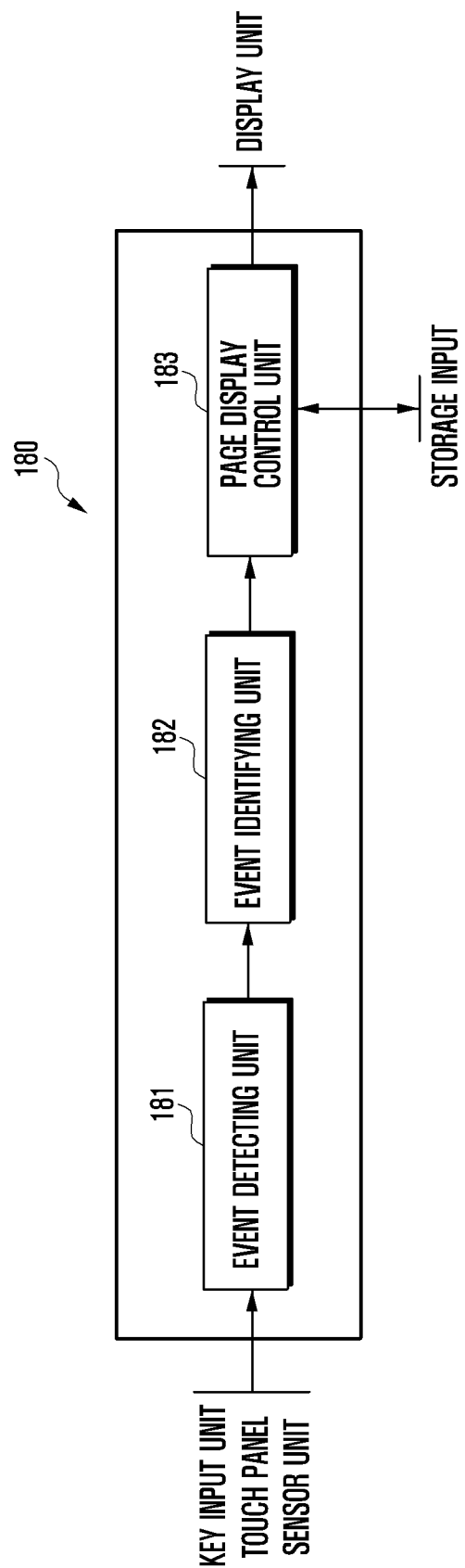
FIG. 2 illustrates a detailed view of the controller shown in FIG. 1.

FIG. 2 illustrates a detailed view of the controller shown in FIG. 1.

Referring to FIG. 2, the controller 180 includes an event detecting unit 181, an event identifying unit 182, and a page display control unit 183.

The event detecting unit 181 is connected to the touch screen 110, the key input unit 120 and the sensor unit 170, and is configured to detect events that occur from the respective components. That is, the event detecting unit 181 detects the user's touch gestures on the touch screen 110 and transfers the corresponding signals to the event identifying unit 182. The event detecting unit 181 detects a user's key operations from the key input unit 120 and transmits the corresponding signals to the event identifying unit 182. The event detecting unit 181 receives information related to the change in location and posture of the electronic mobile device 100 detected by the sensor unit 170 and transmits the information to the event identifying unit 182.

The event identifying unit 182 identifies commands of the event signals transmitted from the event detecting unit 181. The event identifying unit 182 determines whether the event signal is a command for requesting the change of form. If the event identifying unit 182 ascertains that the event signal is a command for requesting the change of form, it transfers the event signal to the page display control unit 183.

The page display control unit 183 receives pages of an e-book, for example, from the storage unit 140. The page display control unit 183 controls the display unit 130 to display e-book pages. The page display control unit 183 receives an event signal for requesting the change of form to display pages of an e-book from the event identifying unit 182. The page display control unit 183 changes the form of pages of the e-book according to the received event signal and controls the display unit 130 to display the pages in the changed form. The page display control unit 183 also controls the display unit 130 to display the difference between the forms before and after the change. If part of the content from other pages is added to a target page according to the change of form, the page display control unit 183 controls the display unit 130 to display the added content and also the content that has been displayed on the target page before the change of form, respectively.

Alternatively, if part of the content in a target page goes over to another page according to the change of form, the page display control unit 183 controls the display unit 130 to display a preview on the page, i.e., overlapping it on the page.

With the convergence of digital devices, there may be many digital devices and modifications thereof, not listed in the application, and, it will be appreciated that they can also be included in the mobile device. For example, the electronic mobile device may further include a GPS module, a camera module, etc. Also, it will be appreciated that, according to the required purpose, the electronic mobile device may be implemented by omitting a particular element from the configuration shown in FIGS. 1 and 2 or replacing it with other elements. It should be understood that the mobile device may further include a touch pad, a track ball, a keyboard, etc., as an input system, other than the touch screen 110 and the key input unit 120.

Figure 3:
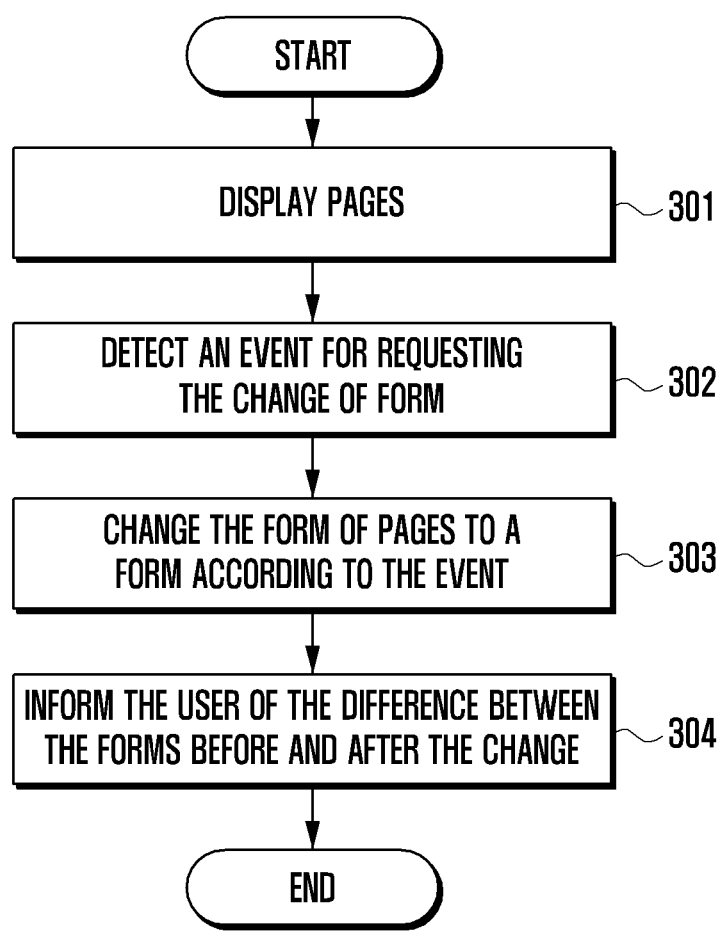
FIG. 3 illustrates a flow chart that describes a method of page display according to an embodiment of the present invention.
Figure 4:
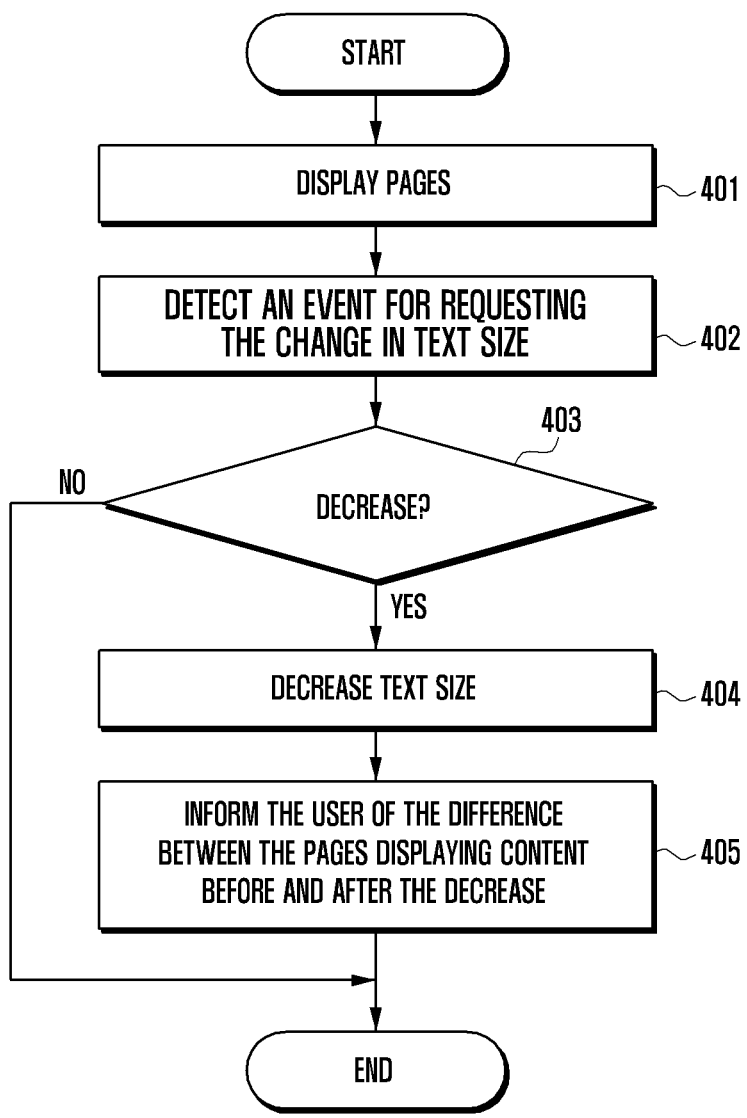
FIG. 4 illustrates a flow chart that describes a method for displaying pages when decreasing the text size, according to an embodiment of the present invention.
Figure 5:
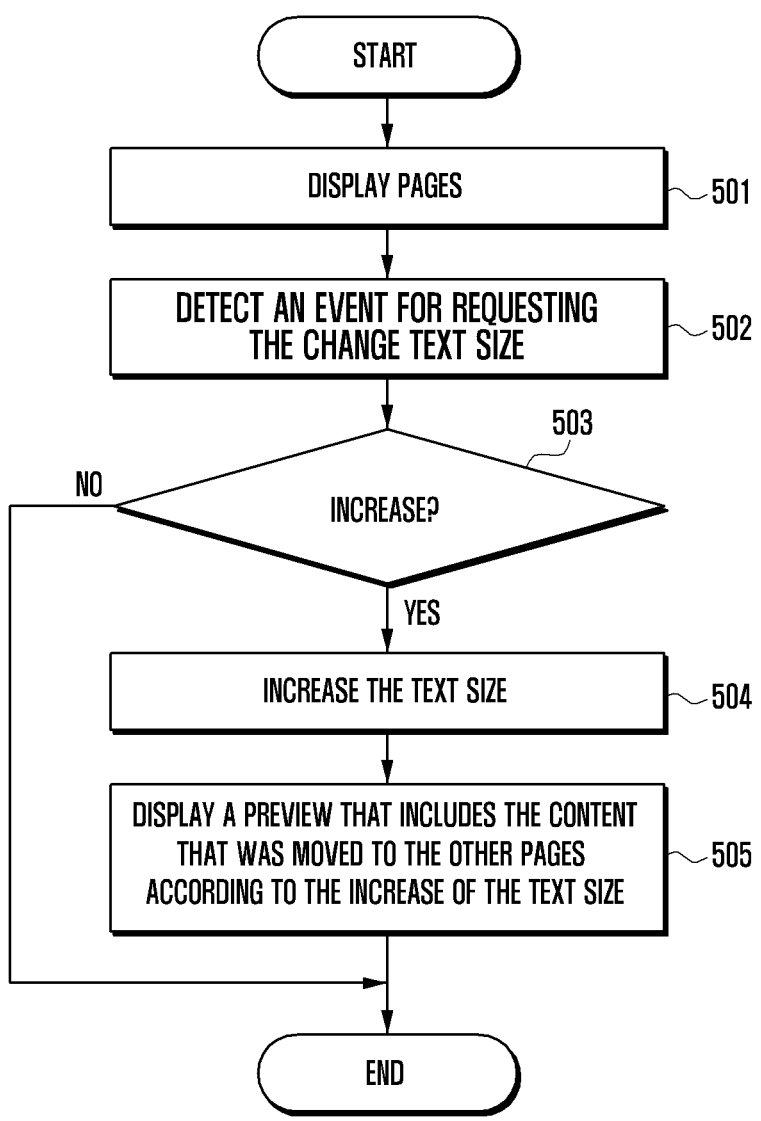
FIG. 5 illustrates a flow chart that describes a method for displaying pages when increasing the text size, according to an embodiment of the present invention.
Figure 6:
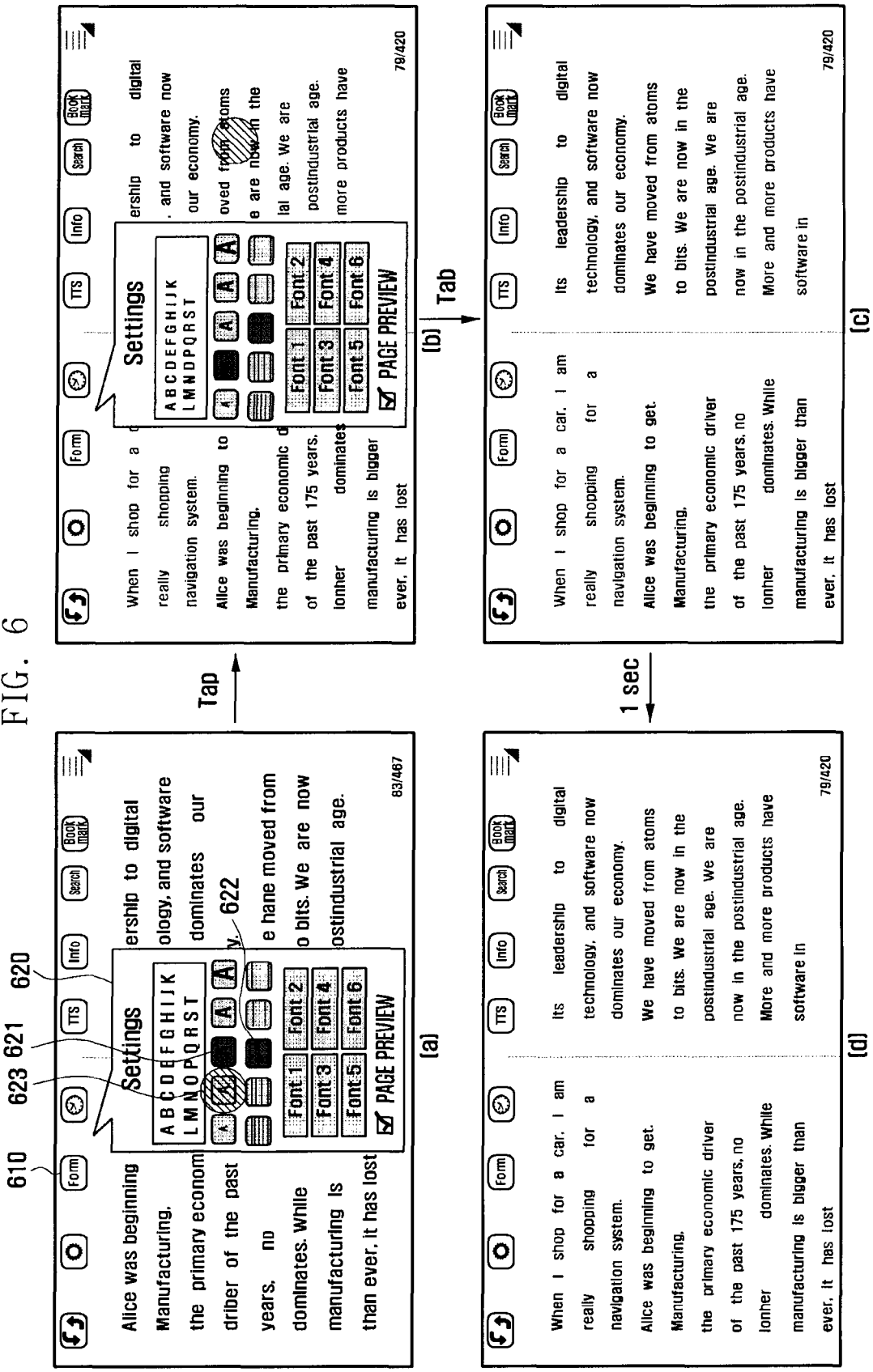
FIGS. 6A to 6D illustrate screens to describe a method for displaying the content decreased in size, according to one exemplary embodiment of the present invention.

Referring to FIGS. 3 to 5, the following description provides embodiments of a method for displaying the pages of an e-book via the electronic mobile device 100.

FIG. 3 illustrates a flow chart that describes a page display method according to an embodiment of the present invention.

Referring to FIG. 3, the controller 180 controls the display unit 130 to display pages on the touch screen 110 at step 301. When the controller 180 detects the presence of an event requesting to change the form of the pages of an e-book on the touch screen 110 displaying the page in step 302, the controller 180 changes the currently displayed page in step 301 in the form corresponding to the event in step 303. When a change is made in the page in the corresponding form, the entire content is re-arranged. Thus, part of the content in a target page may be moved to the other page or, alternatively, part of the content in other page may be added to the target page.

After displaying the page in the form requested for change at step 303, the controller 180 informs the user of the difference between the forms before and after the change in step 304.

If content is added to a target page, the controller 180 controls the display unit 130 to display the added content and the original content. If the controller 180 determines that a preset condition is satisfied, i.e., a preset period of time has elapsed or an event for requesting for releasing of the differentiation between the added content and the original content has occurred, the controller 180 releases the differentiation between the added content and the original content. In an embodiment of the present invention, differentiation between the added content and the original content may be implemented via a method for using different colors, different levels of brightness, or the like. Alternatively, markers may be employed to differentiate between the added content and the original.

On the other hand, if part of the content in the target page goes over to another page, the controller 180 controls the display unit 130 to display a preview on the target page, i.e., overlapping the preview on the target page. After that, if the controller 180 determines that a preset period of time has elapsed or an event for releasing the display of the preview has occurred, the controller 180 stops displaying the preview. The form of page refers to the text size or font size, font, letter spacing, line spacing, style, page direction, etc. The following description provides an exemplary page display method, assuming that the text size or font size has changed.

FIG. 4 illustrates a flow chart that describes a method for displaying pages when decreasing the text size, according to an exemplary embodiment of the present invention.

Referring to FIG. 4, the controller 180 controls the display unit 130 to display pages on the touch screen 110 in step 401. The controller 180 detects the presence of an event for requesting a change in text size on the touch screen 110 displaying the page in step 402. If the controller 180 determines that the event corresponds to a command for decreasing the text size in step 403, it decreases the text size on the page in step 404. After that, the controller 180 informs the user of the difference between the original content in the page and the content added to the page after decreasing the text size at step 405.

FIG. 5 illustrates a flow chart that describes a method for displaying pages when increasing the text size, according to an exemplary embodiment of the present invention.

Referring to FIG. 5, the controller 180 controls the display unit 130 to display pages on the touch screen 110 at step 501. The controller 180 detects the presence of an event for requesting to change the text size on the touch screen 110 displaying the page in step 502. If the controller 180 determines that the event corresponds to a command for increasing the text size in step 503, it increases the text size on the page at step 504. After that, the controller 180 controls the display unit 130 to display a preview on the target page, according to the increase of text size in step 505.

The following description provides an apparatus and method for displaying pages via the electronic mobile device 100, referring to FIGS. 6A and 6D to 15A and 15B.

FIGS. 6A to 6D illustrate screens to describe a first exemplary embodiment of a method for displaying the content decreased in size, according to the present invention.

Referring to FIG. 6A, when the controller 180 detects a user's tap on the form button 610, the controller 180 loads a form setting menu 620 and displays the form setting menu 620 on the touch screen 110. The form setting menu 620 includes a number of buttons for setting, for example, the text size, letter spacing, and font. Buttons 621 and 622, corresponding to the currently set text size and spacing, are displayed in a darker color than the other buttons in the form setting menu 620. If the user taps on a button 623 for setting the text size smaller than the text size of button 621 which has set the current text size by one level, then the controller 180 decreases the text size by one level. After that, the controller 180 re-arranges the entire content based on the decreased text size. As a result, the total number of pages of the e-book is reduced because, for example, part of the content in the other pages is moved to a target page displaying the original content. That is, as shown in FIG. 6B, the display unit 130 displays the added content and the original content, which is differentiated by different levels of brightness. If the user taps on the pages after this re-arrangement, the controller 180 stops displaying the form setting menu 620 as shown in FIG. 6C. After that, if a preset period of time (e.g., 1 second) has elapsed, the controller 180 stops displaying the differentiation as shown by the different levels of brightness between the added content and the original content as illustrated in FIG. 6C. The resulting display is shown in FIG. 6D.

Figure 7:
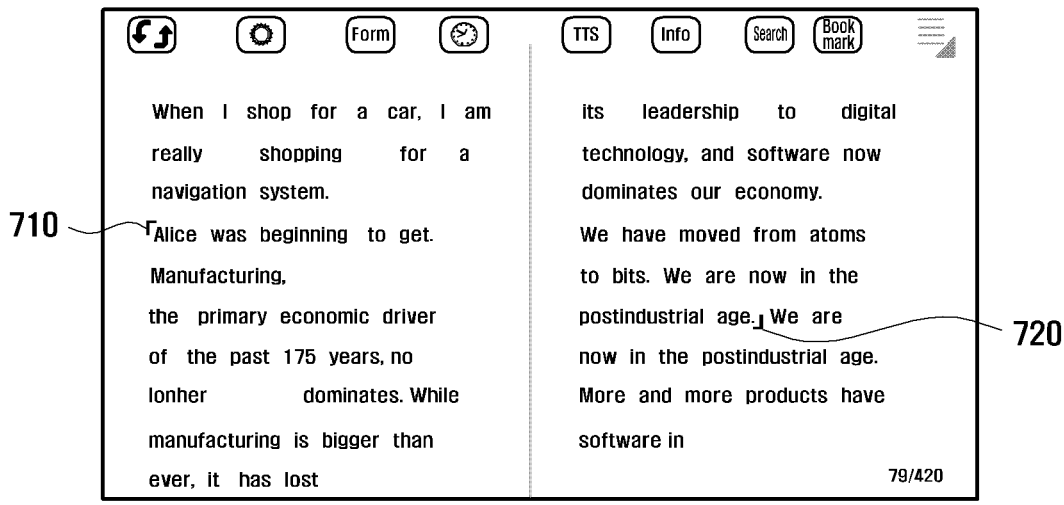
FIG. 7 illustrates a screen to describe a method for displaying the content decreased in size, according to another embodiment of the present invention.
Figure 9:
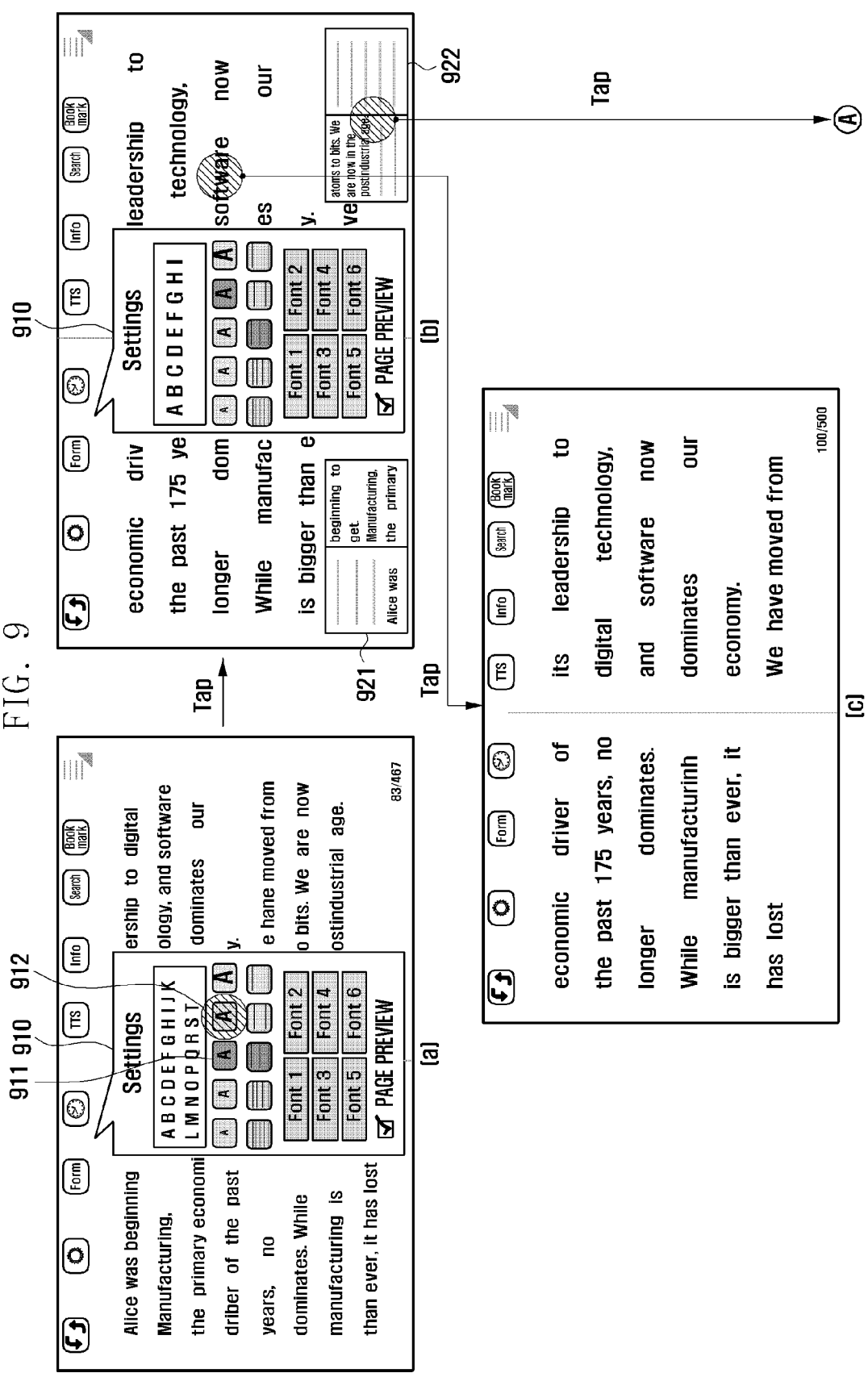
FIGS. 9A to 9C and FIGS. 10A and 10B illustrate screens to describe a method for displaying the content increased in size, according to one embodiment of the present invention.
Figure 10:
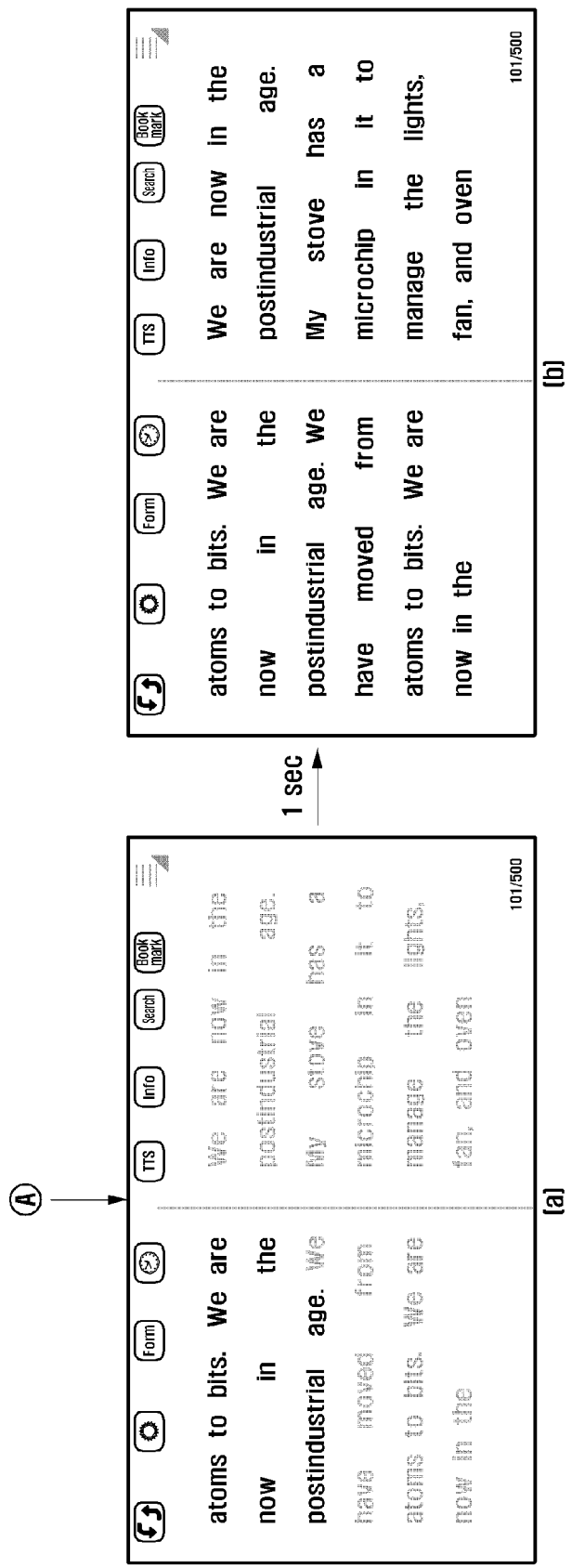
Figure 14:
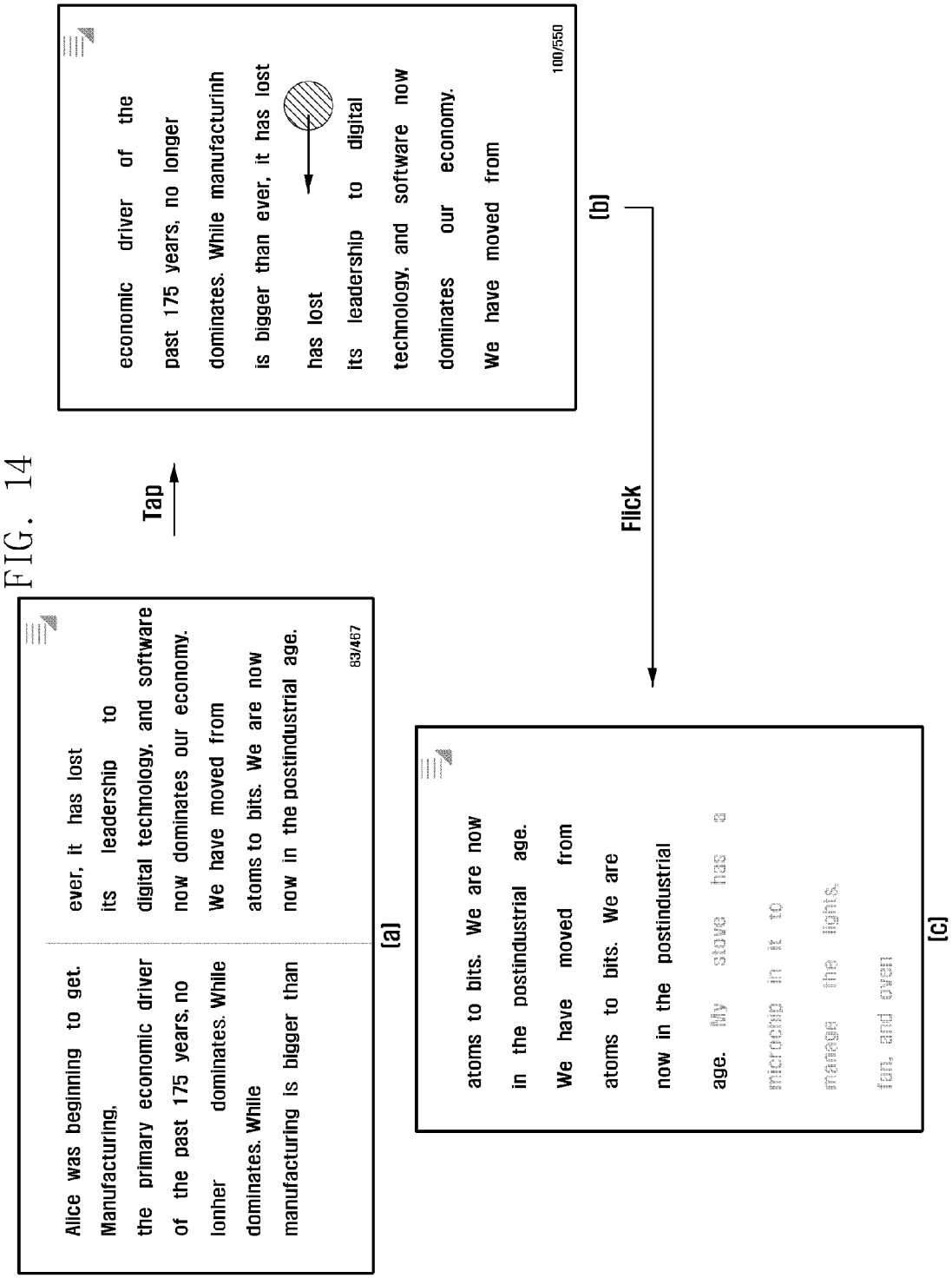
FIGS. 14A to 14C illustrate screens to describe a method for displaying pages via the rotation of a mobile device, according to another embodiment of the present invention.

FIG. 7 illustrates a screen to describe a second exemplary embodiment of a method for displaying the content decreased in size, according to the present invention.

Differentiating between added content and original content via color or brightness may cause eye strain. To resolve this, the controller 180 controls the display unit 130 to display two markers 710 and 720 at the beginning point and end point of the original content. The markers 710 and 720 may automatically disappear if a preset period of time has elapsed after the form setting menu 620 has stopped being displayed.

FIGS. 8A to 8C illustrate screens to describe a third exemplary embodiment of a method for displaying the content decreased in size, according to the present invention. Referring to FIG. 8A, the controller 180 controls the display unit 130 to display a form setting menu 810. If the user taps on a button 812 for setting the text size smaller than the size shown by button 811 that has set the current text size by one level, the controller 180 decreases the text size by one level as shown in FIG. 8B. After that, if the user taps on a button 813 for setting the text size smaller than the size shown in button 812 that has set the current text size by one level, the controller 180 decreases the text size by one level as shown in FIG. 8C. As a result the text size is reduced by two levels (the decrease operation is performed twice) as shown in FIG. 8A. The added content is displayed, differentiating from the original content that has been displayed before the text size was decreased.

FIGS. 9A to 9C and FIGS. 10A and 10B illustrate screens to describe an exemplary embodiment of a method for displaying the content increased in size, according to the present invention.

Referring to FIG. 9A, the controller 180 controls the display unit 130 to display a form setting menu 910. The form setting menu 910 shows 'page preview' that is checked (i.e., enabled). If the user taps on a button 912 for setting the text size larger than the text size of button 911 that has set the current text size by one level, the controller 180 increases the text size by one level. After that, the controller 180 re-arranges the entire content based on the increased text size. In that case, the total number of pages of the e-book is increased. This is because, for example, part of the content in a target page goes over to the other pages. In that case, as shown in FIG. 9B, the controller 180 controls the display unit 130 to display the first 921 and the second 922 previews on the target page at the bottom left and right corners, overlapping preview pages on top of the target page. The first 921 and second 922 previews refer to the previous and next pages respectively, with respect to the target page. The first 921 and second 922 previews display the content moved from the target page, differentiating from the original content that has been included. If the user taps the target page while the preview pages are displayed, the controller 180 controls the display unit 130 to stop displaying the form setting menu 910 and first 921 and second 922 previews as shown in FIG. 9C. Alternatively, if the user taps on the second preview 922, the controller 180 controls the display unit 130 to display the page next to the target page as shown in FIG. 10A. In that case, the content that has been moved from the target page to the next page is displayed, differentiating it from the content that has been included in the next page. This differentiating function, however, is terminated after a preset period of time (e.g., 1 second) has elapsed, as shown in FIG. 10B.

FIGS. 11A to 11D illustrate screens to describe another exemplary embodiment of a method for displaying the content increased in size, according to the present invention.

Referring to FIG. 11A, the controller 180 controls the display unit 130 to display a form setting menu 1110. The form setting menu 1110 shows 'page preview' that is checked off (i.e., disenabled). If the user taps on a button 1112 for setting the text size larger than the size shown by button 1111 that has set the current text size by one level, the controller 180 increases the text size by one level. In that case, the display unit 130 does not display preview pages on the screen as shown in FIG. 11B, since the 'Page preview' is checked off (i.e., disenabled). If the user taps on the target page where the text size has increased, the controller 180 controls the display unit 130 to stop displaying the form setting menu 1110 on the screen as shown in FIG. 11C. If the user flicks to turn over the target page, the controller 180 controls the display unit 130 to display the next page. The next page displays the content that has been moved from the target page, differentiating it from the original content that has been included in the next page as shown in FIG. 11D. This differentiating function, however, is terminated after a preset period of time has elapsed.

FIGS. 12A to 12C illustrate screens to describe a further exemplary embodiment of a method for displaying the content increased in size, according to the present invention.

Referring to FIG. 12A, the controller 180 controls the display unit 130 to display a form setting menu 1210. The form setting menu 1210 shows 'page preview' that is checked (i.e., enabled). If the user taps on a button 1212 for setting the text size larger than a button 1211 that has set the current text size by one level, the controller 180 increases the text size by one level and controls the display unit 130 to display the text increased in size and preview pages as shown in FIG. 12B. After that, if the user taps on a button 1213 for setting the text size larger by one level than the button 1212 that has set the current text size, the controller 180 increases the text size by one level, which accordingly increases the text size two levels from the text size as shown in FIG. 12A due to the increase operation being performed twice. and the controller 180 controls the display unit 130 to display the text increased in size and the preview pages as shown in FIG. 12C. The number of preview pages may be determined according to the levels of increasing the text size. In an exemplary embodiment of the invention, two preview pages are displayed on both bottom left and right of the target page. The preview page may serve as an indicator 1220. That is, if the user taps on the indicator 1220, the controller 180 controls the display unit 130 to display the other preview page.

As described above, changing the form of pages of an e-book may be achieved by operating the form setting menu. Alternatively, the form of pages of an e-book may be automatically changed by rotating the electronic mobile device 100.

FIGS. 13A and 13B illustrate screens to describe an exemplary embodiment of a method for displaying pages via the rotation of an electronic mobile device, according to the present invention.

FIG. 13A shows the screen of the electronic mobile device 100 when it operates in a landscape mode. In other words, the width is rotated in the vertical direction. In a landscape mode, the electronic mobile device 100 displays the content of the pages on the whole width of the screen. Although it is not shown in FIG. 13A, the form setting menu has set the 'Page preview' to be checked (i.e., enabled). If the user rotates (holds) the electronic mobile device 100 in such a way that the length is rotated in the vertical direction, the controller 180 detects the rotation of the mobile device 100 via the sensor unit 170 and changes the form of pages according to the detected rotation. That is, the controller 180 orients and displays the pages from a landscape mode to a portrait mode. When changing the form of the pages to a vertical form, part of the content in the target page may be moved to the other pages. In that case, the controller 180 displays preview pages on the screen as shown in FIG. 13B.

FIGS. 14A to 14C illustrate screens to describe another exemplary embodiment of a method for displaying pages via the rotation of an electronic mobile device, according to the present invention.

FIG. 14A shows the screen of the mobile device 100 when it operates in a landscape mode. In other words, the width is rotated in the vertical direction. In a landscape mode, the electronic mobile device 100 displays the content of pages on the whole width of the screen. Although it is not shown in FIG. 14A, the form setting menu has set the 'Page preview' to be checked off (i.e., disenabled). If the user rotates (holds) the mobile device 100 in such a way that the length is rotated in the vertical direction, the controller 180 detects the rotation of the mobile device 100 via the sensor unit 170 and changes the form of the pages according to the detected rotation. That is, the controller 180 orients and displays the pages from a landscape mode to a portrait mode. During the process, the controller 180 does not display preview pages on the screen as shown in FIG. 14B, since the 'Page preview' is checked off (i.e., disenabled). If the user flicks to turn over the page, the controller 180 controls the display unit 130 to display the next page. The next page displays the content that has been moved from the target page, differentiating it from the original content that has been included in the next page as shown in FIG. 14C. This differentiating function, however, is terminated after a preset period of time has elapsed.

FIGS. 15A and 15B illustrate screens to describe a further exemplary embodiment of a method for displaying pages via the rotation of an electronic mobile device, according to the present invention.

FIG. 15A shows the screen of the electronic mobile device 100 when it operates in a portrait mode. In other words, the length is rotated in the vertical direction. In a portrait mode, the mobile device 100 displays the content of pages on the whole length of the screen. If the user rotates (holds) the mobile device 100 in such a way that the width is rotated in the vertical direction, the controller 180 detects the rotation of the mobile device 100 via the sensor unit 170 and changes the form of the pages according to the detected rotation. That is, the controller 180 orientates and displays the pages from a portrait mode to a landscape mode. In that case, the target page may further include part of the content moved from other pages. The controller 180 controls the display unit 130 to display the original content and the added content, differentiating them from each other, as shown in FIG. 15B.

As described above, the page display apparatus and method according to the invention can allow users to easily and rapidly look for a part of an e-book that they have read, although the form of the pages in the e-book have changed.

As described above, the page display apparatus and method according to the invention can be implemented with program commands that can be conducted via various types of computers and recorded in computer-readable recording media. The computer-readable recording media contain program commands, data files, data structures, or the like, or a combination thereof. The program commands recorded in the recording media may be designed or configured to comply with the invention or may be software well-known to the ordinary person skilled in the art. The computer-readable recoding media includes hardware systems for storing and conducting program commands. Examples of the hardware systems are magnetic media such as a hard disk, floppy disk, a magnetic tape, optical media such as CD-ROM and DVD, Magneto-Optical Media, such as optical disk, ROM, RAM, flash memory, etc. The program commands include assembly language or machine code complied by a complier and a higher level language interpreted by an interpreter. The hardware systems may be implemented with at least one software module to comply with the invention.

Although exemplary embodiments of the invention have been described in detail hereinabove, it should be understood that many variations and modifications of the basic inventive concept herein described, which may be apparent to those skilled in the art, will still fall within the spirit and scope of the exemplary embodiments of the invention as defined in the appended claims.

What is claimed is:

1. A method for displaying pages of an e-book on an electronic mobile device, comprising:
   displaying at least one page of the pages;
   detecting the presence of an event;
   changing a form of the displayed at least one page by displaying a first rearranged page of a final form, and containing a portion of content of the at least one page in a form with an enlarged font or a reduced font relative to a font size of the at least one page, the form corresponding to the detected event; and
   displaying a difference between the form before the change and the form after the change;
   wherein displaying the difference comprises:
   displaying a preview overlapping the first rearranged page, the preview being an image of a second rearranged page preceding or succeeding the first rearranged page, the preview including first content which was included in the at least one page but is not part of the first rearranged page, and second content which was not included in the at least one page, wherein the first content is visually differentiated in the preview from the second content.

2. The method of claim 1, wherein displaying the difference further comprises:
   releasing, if a condition for releasing the differentiation between the form before and after the change is satisfied, the differentiation therebetween.

3. The method of claim 1, further comprising:
   displaying, if the preview is selected by a user, the second rearranged page which corresponds to the preview.

4. The method of claim 1, wherein:
   displaying the difference comprises:
   displaying, if an event for turning over the first rearranged page occurs, another rearranged page,
   wherein content moved to the another rearranged page, and original content of the pages displayed before the change of the form, are displayed, where the moved content and the original content are differentiated from each other.

5. The method of claim 1, wherein the change in form further comprises a change in one or more of:
   font, letter spacing, line spacing, style and page direction.

6. A method for displaying pages on an electronic mobile device, comprising:
   displaying at least one page of a plurality of pages of an e-book;
   detecting an event for increasing text size of the e-book;
   increasing the text size of the e-book in response to the event; and
   displaying a preview overlapping a first rearranged page of a final form, that has increased text size representing a first part of content of the at least one page, the preview being an image of a second rearranged page preceding or succeeding the first rearranged page, the preview including first content which was included in the at least one page but is not part of the first rearranged page, and second content which was not included in the at least one page, wherein the first content is visually differentiated in the preview from the second content.

7. An apparatus for displaying pages of an e-book on an electronic mobile device, comprising:
   an input unit to create an event according to a request of a change of a form;
   a controller for changing the form of the pages to the form corresponding to the event; and
   a display unit to display at least one page, containing content, of the pages prior to the form change; for displaying, after the form change, a first rearranged page of a final form, and containing a portion of the content; and for displaying a difference between the forms before and after the change;
   wherein the display unit displays a preview overlapping the first rearranged page, the preview being an image of a second rearranged page preceding or succeeding the first rearranged page, the preview including first content which was included in the at least one page but is not part of the first rearranged page, and second content which was not included in the at least one page, wherein the first content is visually differentiated in the preview from the second content.

8. The apparatus of claim 7, wherein the controller detects the event that occurs in the input unit, identifies whether the detected event corresponds to the event for requesting the change of the form of the pages, changes the form according to the event, and commands the display unit to display the difference between the forms before the change and the form after the change.

9. The apparatus of claim 7, wherein the controller releases, if a condition for releasing the differentiation between the form before and after the change is satisfied, the differentiation therebetween.

10. The apparatus of claim 7, wherein the controller controls, if the preview is selected by a user, the display unit to display the second rearranged page which corresponds to the preview.

11. The apparatus of claim 7, wherein the display unit displays, if an event for turning over the first rearranged page occurs, another rearranged page, wherein content moved to the another rearranged page, and original content of the pages displayable before the change of the form, are displayed on the another rearranged page, where the moved content and the original content are differentiated from each other.

12. The apparatus of claim 7, wherein the change in form further comprises a change in one or more of font, letter spacing, line spacing, style and page direction.

13. A non-transitory recordable medium having stored thereon instructions which, when executed in a mobile device, cause the mobile device to perform the method of claim 1.

14. The non-transitory recordable medium of claim 13, further comprising:
   computer implemented programs stored thereon including:
   an operating system (OS) for booting and controlling the mobile device, and at least one application program.

* * * * *